(12) United States Patent
Chen et al.

(10) Patent No.: US 10,094,124 B2
(45) Date of Patent: Oct. 9, 2018

(54) ENGINEERED PLANK MATERIAL HAVING WATERPROOFED VENEER AND ITS MANUFACTURING METHOD

(71) Applicant: Wellmade Floor Covering Int'l Inc., Wilsonville, OR (US)

(72) Inventors: Ming Chen, Wilsonville, OR (US); Zhu Chen, Jiangsu (CN)

(73) Assignee: WELLMADE FLOOR COVERING INT'L INC., Wilsonville, OR (US)

( * ) Notice: Subject to any disclaimer, the term of this patent is extended or adjusted under 35 U.S.C. 154(b) by 197 days.

(21) Appl. No.: 15/146,182

(22) Filed: May 4, 2016

(65) Prior Publication Data

US 2017/0321435 A1    Nov. 9, 2017

(51) Int. Cl.
| | |
|---|---|
| *B32B 7/12* | (2006.01) |
| *E04F 15/04* | (2006.01) |
| *B32B 17/06* | (2006.01) |
| *B32B 37/10* | (2006.01) |
| *B32B 37/12* | (2006.01) |

(Continued)

(52) U.S. Cl.
CPC ............ *E04F 15/042* (2013.01); *B32B 5/024* (2013.01); *B32B 5/028* (2013.01); *B32B 7/12* (2013.01); *B32B 17/065* (2013.01); *B32B 21/06* (2013.01); *B32B 21/10* (2013.01); *B32B 21/14* (2013.01); *B32B 29/005* (2013.01); *B32B 37/10* (2013.01); *B32B 37/12* (2013.01); *E04F 15/102* (2013.01); *E04F 15/107* (2013.01); *B32B 2262/101* (2013.01); *B32B 2305/38* (2013.01); *B32B 2307/3065* (2013.01);

(Continued)

(58) Field of Classification Search
CPC ..... E04F 15/042; E04F 15/102; E04F 15/107; B32B 17/065; B32B 7/12; B32B 37/10; B32B 37/12; B32B 2262/101; B32B 2307/3065; B32B 2471/00; B32B 2305/38

See application file for complete search history.

(56) References Cited

U.S. PATENT DOCUMENTS 4,044,185 A * 8/1977 McCaskey, Jr. ........ B32B 29/04
428/153
8,071,193 B2   12/2011 Windmoller
(Continued)

FOREIGN PATENT DOCUMENTS

| CN | 105479866 A | 4/2016 | |
|---|---|---|---|
| WO | WO-2015126436 A1 * | 8/2015 | ............. B32B 21/14 |

OTHER PUBLICATIONS

English Machine Translation of Abstract of CN10579866.
English Machine Translation of CN10579866.

*Primary Examiner* — Jeremy R Pierce
(74) *Attorney, Agent, or Firm* — Thompson Coburn LLP

(57) ABSTRACT

An engineered plank material and a method for making the plank material are disclosed. The plank material includes a veneer that is made out of plant material, and includes a nonwoven fabric or fiberglass mesh adhered to an inward-facing portion of the veneer. The plank material includes an adhesive paper material including macromolecular glue, which is between the veneer and a third layer of the plank material, which is constructed from one of bamboo, wood, or paper. The plank material then includes a fourth layer which is an adhesive paper material including a micromolecular glue. These layers are compressed together at a high heat and a high pressure in order to form the plank material.

14 Claims, 3 Drawing Sheets

(51) Int. Cl.
*E04F 15/10* (2006.01)
*B32B 5/02* (2006.01)
*B32B 21/06* (2006.01)
*B32B 21/10* (2006.01)
*B32B 21/14* (2006.01)
*B32B 29/00* (2006.01)

(52) U.S. Cl.
CPC ..... *B32B 2307/558* (2013.01); *B32B 2307/73* (2013.01); *B32B 2419/04* (2013.01); *B32B 2471/00* (2013.01)

(56) References Cited

U.S. PATENT DOCUMENTS

| | | |
|---|---|---|
| 8,728,603 B2 | 5/2014 | Windmoller |
| 8,857,127 B2 | 10/2014 | Windmoller |
| 2006/0165948 A1 | 7/2006 | Gold |
| 2007/0218260 A1* | 9/2007 | Miclo ..................... B32B 5/18 428/211.1 |
| 2009/0155612 A1 | 6/2009 | Pervan et al. |

* cited by examiner

ENGINEERED PLANK MATERIAL HAVING WATERPROOFED VENEER AND ITS MANUFACTURING METHOD

FIELD OF THE INVENTION

The present invention relates generally to engineered plank flooring, and more specifically to engineered plank flooring that is manufactured to be more hydrophobic and a method of manufacturing the plank flooring.

BACKGROUND

Existing engineered plank flooring, such as fireproof plank flooring, is generally made of raw paper (such as kraft paper infused with titanium powder) that is combined with melamine and phenolic resin and finished in a high heat and pressure environment. This flooring has a number of disadvantages such as not being waterproof and having relatively low impact resistance. Similarly, bamboo and laminate flooring has disadvantages such as not being waterproof, fireproof, and having relatively low impact resistance. Exposure to water can cause expansion and deformation of these types of flooring, and may even lead to flooring damage. Exposure to water can also cause contamination of the flooring, and can lead to mold and mites in the flooring, which can cause health problems. Accordingly, it may be desired to manufacture a flooring that is more waterproof, fireproof, and more resistant to impact than existing conventional flooring.

SUMMARY

One aspect of the present disclosure provides a compressed engineered flooring material constructed with a plurality of layers. The compressed layered flooring material (CLFM) or compressed layered plank material (CLPM) includes a first layer of the plurality of layers, the first layer constructed from plant material, such as wood, bamboo, or another plant-based component, and including one of a nonwoven fabric and a fiberglass mesh adhered to an inward-facing portion of the first layer in order to increase the impact resistance of the CLFM, and a second layer of the plurality of layers, the second layer constructed from an adhesive paper material infused with a macromolecular glue. The CLFM further includes a third layer of the plurality of layers, the third layer constructed from one of bamboo, wood, or paper, and a fourth layer of the plurality of layers, the fourth layer constructed from an adhesive paper material infused with, or otherwise including, a micromolecular glue, wherein at least two of the plurality of layers are compressed together at a temperature of greater than 100 degrees Celsius (° C.) and a pressure of greater than 1500 metric tons per sheet, where a sheet is 4 feet by 8 feet, or 505 kPa.

In some aspects, the macromolecular glue is made up of 50-55% melamine, 35-40% plasticizer, and 3-5% formaldehyde, and the micromolecular glue is made up of 70-82% melamine, 5-12% plasticizer, and 3-6% formaldehyde. The remainder of both the macromolecular and micromolecular glues may be other materials or volatile glue solvents.

The first layer and the third layer may be constructed from plant material that has been dry balanced and permeated with flame retardant material. For example, the plant material may be kiln dried in order to reduce the moisture content, and to ensure that the moisture content is even or balanced. Reducing the moisture content of the material may help the material to be more insect-resistant and free of mildew.

The third layer may be constructed from plant material that has been de-sugared and skimmed. The de-sugaring and skimming might be done at a controlled steam pressure of between 245 and 490 kPa.

Each layer of the plurality of layers may be compressed together at a temperature of greater than 100° C. and a pressure of greater than 1500 metric tons per sheet, or 505 kPa. At least two of the plurality of layers may be compressed together at a temperature of greater than 100° C. and less than 300° C., a pressure of greater than 1500 metric tons per sheet, or 505 kPa and less than 5000 metric tons per sheet, or 1680 kPa, and for a time of between three and six hours.

Another aspect of the present disclosure describes a method of manufacturing CLFM. The method includes de-sugaring and skimming fat from one or more plant material layers, applying a nonwoven fabric or fiberglass mesh to an inward-facing portion of a plant material veneer, and dry balancing each of the one or more plant material layers and the plant material veneer to control a moisture content in each of the one or more plant material layers and the plant material veneer. The method further includes permeating each of the one or more plant material layers and the plant material veneer with flame retardant under negative pressure, and compressing each of the one or more plant material layers and the plant material veneer together, placing adhesive paper between each of the one or more plant material layers and the plant material veneer, at a temperature of greater than 100° C. and a pressure of greater than 1500 metric tons per sheet, or 505 kPa.

In some aspects, de-sugaring and skimming fat from one or more plant material layers may be done while controlling steam pressure to be between 245 and 490 kPa. Compressing each of the one or more plant material layers and the plant material veneer together may be done at a temperature of less than 300° C. and a pressure of less than 5000 metric tons per sheet, or 1680 kPa. In some aspects, a first layer of adhesive paper may be placed between the plant material veneer and a plant material layer of the one or more plant material layers, the first layer of adhesive paper infused with macromolecular glue. A second layer of adhesive paper may be placed adjacent to the plant material layer of the one or more plant material layers on a side opposite the first layer, the second layer of adhesive paper infused with micromolecular glue.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which.

DETAILED DESCRIPTION

Figure 1:
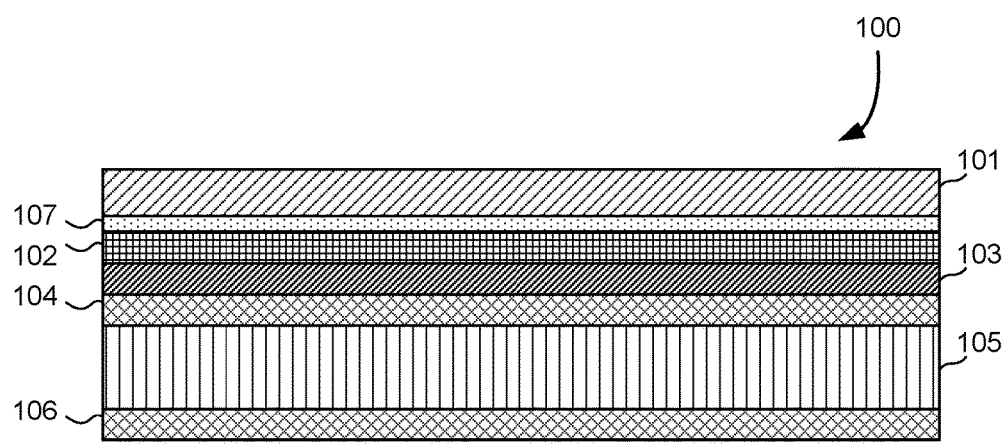
FIG. 1 is an exemplary flooring material according to some aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include an engineered flooring plank that is waterproof, fireproof, and resistant to impact. The compressed layered flooring material (CFLM) or compressed layered plank material (CLPM) can include a veneer top layer and repeated layers of paper, fiberglass mesh, bamboo and/or wood. The veneer top layer may be made out of bamboo or wood. The paper may include adhesive paper, kraft paper or other types of paper. The mesh layer may be a fiberglass mesh layer. For example, every second layer may be a layer of adhesive paper. In some aspects, a fiberglass mesh may be adhered to a piece of plant material, such as wood, bamboo, or another plant-based component, in order to make a veneer that is less prone to cracking under impact.

The multiple layers in the CLFM (or CLPM) may be compressed together under high heat and high pressure. In some aspects, underneath the top layer (veneer) of the CLFM, there may be first adhesive paper layer. This first adhesive paper layer may include a macromolecular glue. Other adhesive paper layers below the first adhesive paper layer may use micromolecular glue.

Generally macromolecular glue may comprise 50-55% melamine, 35-40% plasticizer, and 3-5% formaldehyde. Micromolecular glue may include significantly more melamine than macromolecular glue, and less plasticizer. For example, micromolecular glue may comprise 70-82% melamine, 5-12% plasticizer, and 3-6% formaldehyde. The remainder of both the macromolecular and micromolecular glues may be other materials or volatile glue solvents. Other formulations may exist for both glues, but generally, the micromolecular glue may include more melamine than less plasticizer than the macromolecular glue.

Generally, some or all layers of the plank which are constructed out of plant material may be de-sugared and skimmed under high pressure. In some aspects, each plant material layer other than the veneer of the CLFM may be de-sugared and skimmed under high pressure. Some or all of the plant material layers including the veneer may also be dry balanced, and permeated with flame retardant materials. A nonwoven fabric or fiberglass mesh layer may be applied to the veneer in order to increase resistance to impact and to prevent cracking.

For example, in one aspect, CLFM may be constructed by first de-sugaring each plant material layer except the veneer, and skimming those layers under high temperature. Second, a nonwoven fabric or fiberglass mesh layer may be applied to the veneer. Third, each plant material layer including the veneer may be dry balanced. Fourth, the dry balanced plant material layers may be permeated with flame retardants under negative pressure. Fifth, layers of paper and mesh and plant material may be repeatedly spread onto the CLFM and compressed together using a press machine under high heat and high pressure.

During de-sugaring and skimming, the plant material layer may have a steam pressure of approximately 245 to 490 kPa. When the layers are compressed together at a high heat and pressure, a press machine may be used. This machine may control heat to between 100° C. and 300° C., and the pressure may be controlled to be between 1500 metric tons per sheet, or 505 kPa, and 5000 metric tons per sheet, or 1680 kPa.

Due to the use of a macromolecular glue in the first adhesive paper layer, this glue may semi-penetrate into the veneer. This may help to finish the painting treatment afterwards. Glue may also completely penetrate into kraft paper of fiberglass mesh layers, between the plant material layers as a result of applying micromolecular glue to layers of adhesive paper other than the first adhesive paper layer. This can help achieve a waterproofing function for the CLFM. Further, applying a nonwoven fabric or fiberglass mesh layer to the back of the veneer may prevent the veneer from cracking and increase the smoothness and stability of the finished CLFM. This nonwoven fabric or fiberglass mesh layer can also increase the impact resistance of the CLFM, and once it is permeated with fire retardant, may also aid in fireproofing the CLFM.

FIG. 1 is an exemplary CLFM 100 according to some aspects of the present disclosure. The CLFM 100 is a 0.6 mm thick compressed oak wood plank. The CLFM 100 includes a first layer, or veneer, that is a 0.45 mm thick oak panel 101 which has nonwoven fabric 107 adhered to the inward-facing portion of the panel 101. The CLFM includes a 0.05 mm thick adhesive paper layer 102 which is permeated with macromolecular glue. The CLFM 100 then includes a 0.2 mm thick layer of kraft paper 103, and a 0.1 mm thick layer of adhesive paper 104 which has been permeated with micromolecular glue. The CLFM 100 further includes a 0.5 mm thick poplar layer 105, and finally a 0.1 mm thick adhesive paper layer 106 which has been permeated with micromolecular glue.

In general, a nonwoven fabric or fiberglass mesh layer 107 may be applied to the 0.45 mm thick oak panel 101, in order to increase impact resistance of the CLFM 100. The type of nonwoven fabric or fiberglass mesh layer 107 that is used may depend, at least in part, on the type and thickness of the panel 101. Here, for a 0.45 mm thick oak panel 101, a 40 mesh nonwoven fabric 107 may be used.

The CLFM 100 manufacturing process is as follows:

1. The sugar and fat in the wood other than the oak panel 101 is first skimmed off at a high temperature. The 0.5 mm poplar layer 105 is treated at a high temperature, and steam pressure is controlled to be less than 305 kPa. This may take approximately two and one half hours to complete.

2. Next, glue is used to apply a 40 mesh nonwoven fabric 107 to the 0.45 mm oak panel 101.

3. Next, both the 0.5 mm poplar panel 105 and the 0.45 mm oak panel 101 are dry balanced. This process controls the water content of the panels to be between 8% and 9%.

4. Next, both the 0.5 mm poplar panel 105 and the 0.45 mm oak panel 101 are permeated with flame retardant under negative pressure.

5. Next, the various layers of the CLFM 100 are layered in the illustrated order and described order into a press machine, and then pressed together to form a plank. The press temperature is set at 225° C., the pressure is set at 2000 tons per sheet, or 672 kPa, and pressing time is 6 hours.

Using this method, a 0.6 mm thick engineered CLFM 100 may be created with an oak veneer 101. The material may have a water swelling rating of 0.18% length-wise, 0.6% laterally and 1.25% in vertical thickness. The flammability rating of the CLFM 100 may be V-2, as evaluated based on the Standard for Safety of Flammability of Plastic Materials for Parts in Devices and Appliances testing, and the compression ratio of the CLFM 100 may be 2.33.

Figure 2:
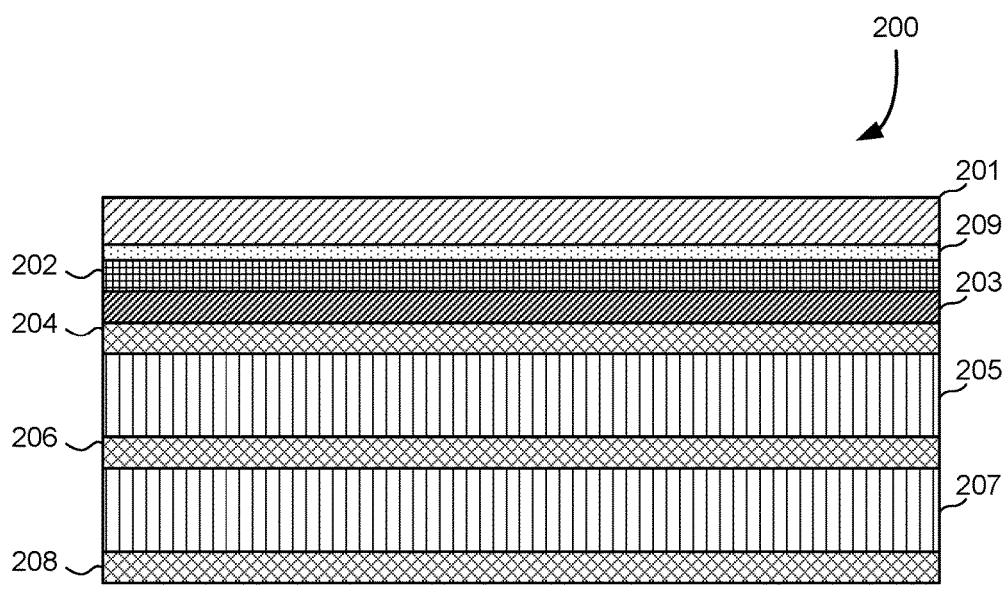
FIG. 2 is another exemplary flooring material according to some aspects of the present disclosure, including two wood layers in addition to a veneer.

FIG. 2 is another exemplary CLFM 200 according to some aspects of the present disclosure. This CLFM 200 is 1.15 mm thick compressed black walnut wood flooring. The CLFM 200 includes a first layer, the veneer, which is a 0.5 mm thick black walnut panel 201 with a 20 mesh nonwoven fabric 209 which is applied to the back (inward-facing) side of the walnut panel 201 using glue in order to prevent the veneer from cracking, such as during an impact. Next, there is a 0.05 mm thick adhesive paper 202 which is infused with macromolecular glue. Next, there is a 0.2 mm thick kraft paper layer 203, and a 0.1 mm thick adhesive paper layer 204, which is permeated with micromolecular glue. The CLFM 200 also includes a 0.8 mm thick poplar layer 205, a 0.1 mm thick adhesive paper layer 206 which is permeated with micromolecular glue, a 0.8 mm thick poplar layer 207, and a 0.1 mm thick adhesive paper layer 208 which is permeated with micromolecular glue.

The CLFM 200 manufacturing process is as follows:

1. The sugar and fat in the wood layers other than the veneer 201 is first skimmed off at a high temperature. The 0.8 mm poplar layers 205, 207 are treated at a high temperature, and steam pressure is controlled to be less than 343 kPa. This may take approximately three hours to complete.

2. Next, glue is used to apply a 20 mesh nonwoven fabric 209 to the 0.5 mm black walnut panel 201.

3. Next, the 0.8 mm poplar panels 205, 207 and the 0.5 mm black walnut panel 201 are dry balanced. This process controls the water content of the panels to be between 6% and 7%.

4. Next, the wood panels 201, 205, 207 are permeated with flame retardant under negative pressure.

5. Next, the various layers of the CLFM 200 are layered in the illustrated order and described order into a press machine, and then pressed together to form a plank. The press temperature is set at 190° C., the pressure is set at 2500 tons per sheet, or 840 kPa, and the total pressing time is 4 hours.

The CLFM 200 produced according to this process can be 1.15 mm thick, and can have a water-swelling rating of 0.13% length wise, 1.22% laterally and 5.22% in vertical thickness. The CLFM 200 may have a V-2 flammability rating.

Generally, one flooring material may be chosen over another, such as CLFM 100 over CLFM 200, based upon the needs of a particular application. For example, different flooring materials may have difference performance characteristics and rigidity strengths, and so may be chosen on this basis.

Figure 3:
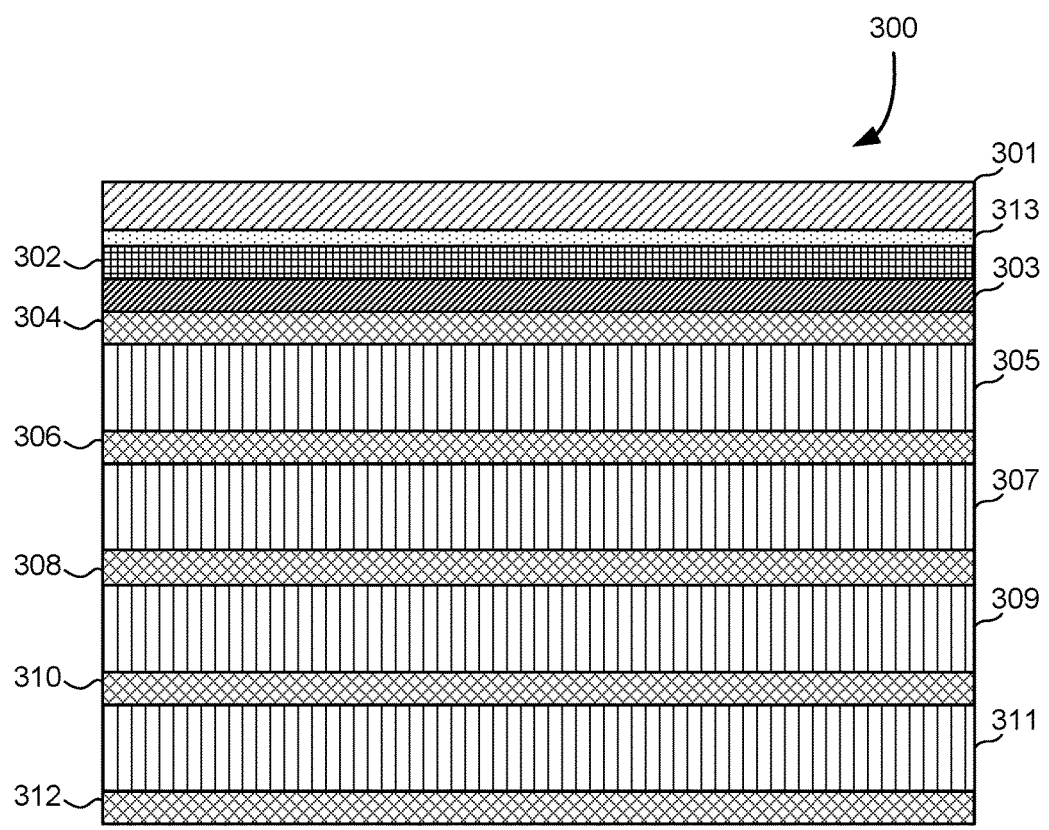
FIG. 3 is another exemplary flooring material according to some aspects of the present disclosure, including four wood layers in addition to the veneer.

FIG. 3 is another exemplary CLFM 300 according to some aspects of the present disclosure. The CLFM 300 is 2.1 mm thick compressed birch wood flooring. The CLFM 300 includes a veneer which is 0.5 mm birch panel 301 with a 20 mesh nonwoven fabric 313 which is applied to the back (inward-facing) side of the birch panel 301 using glue in order to prevent the veneer from cracking, such as during an impact. Next, there is a 0.05 mm thick adhesive paper 302 which is permeated with macromolecular glue. Next, there is a 0.2 mm thick kraft paper layer 303, and a 0.1 mm thick adhesive paper layer 304, which is permeated with micromolecular glue. The CLFM 300 also includes a 0.8 mm thick poplar layer 305, and then a 0.1 mm thick adhesive paper layer 306, which is permeated with micromolecular glue. The CLFM 300 also includes a 0.8 mm thick poplar layer 307, and then a 0.1 mm thick adhesive paper layer 308, which is permeated with micromolecular glue, and then another 0.8 mm thick poplar layer 309 and a 0.1 mm thick adhesive paper layer 310, which is permeated with micromolecular glue, followed by another 0.8 mm poplar layer 311 and a 0.1 mm thick adhesive paper layer 312, which is permeated with micromolecular glue. As described, there may be any number of wood layers after the 0.5 mm birch panel 301 veneer, where each of the subsequent wood layers is separated from one another by an adhesive paper layer with micromolecular glue. As described, CFLM 300 is much thicker and sturdier than CFLM 100 and CFLM 200, in FIGS. 1 and 2, as CFLM 300 includes four layers of wood other than the veneer whereas CFLM 100 and CFLM 200 both include only one layer of wood under than the veneer.

The CLFM 300 manufacturing process is as follows:

1. The sugar and fat in the wood layers other than the 0.5 mm birch panel 301 is skimmed off at a high temperature. The 0.8 mm thick poplar layers 305, 307, 309, 311 are treated at a high temperature, and steam pressure is controlled to be less than 294 kPa. This may take approximately two hours to complete.

2. Next, glue is used to apply a 40 mesh nonwoven fabric 313 to the 0.5 mm birch panel 301 which will be the veneer 301 for the CLFM 300.

3. Next, each of the 0.8 mm thick poplar layers 305, 307, 309, 311 and the 0.5 mm birch panel 301 are dry balanced. This process controls the water content of the panels to be between 6% and 7%.

4. Next, each of the 0.8 mm thick poplar layers 305, 307, 309, 311 and the 0.5 mm birch panel 301 are permeated with flame retardant under negative pressure.

5. Next, the various layers of the CLFM 300 are layered in the illustrated order and described order into a press machine, and then pressed together to form a plank. The press temperature is set at 210° C., the pressure is set at 2500 tons per sheet, or 840 kPa, and the total pressing time is 6 hours.

A CLFM 300 that is made using this process may be 2.1 mm thick, and may have a water swelling rate of 0.2% lengthwise, 1.53% laterally, and 3.53% in vertical thickness. The CLFM 300 may have a V-2 flammability rating.

Figure 4:
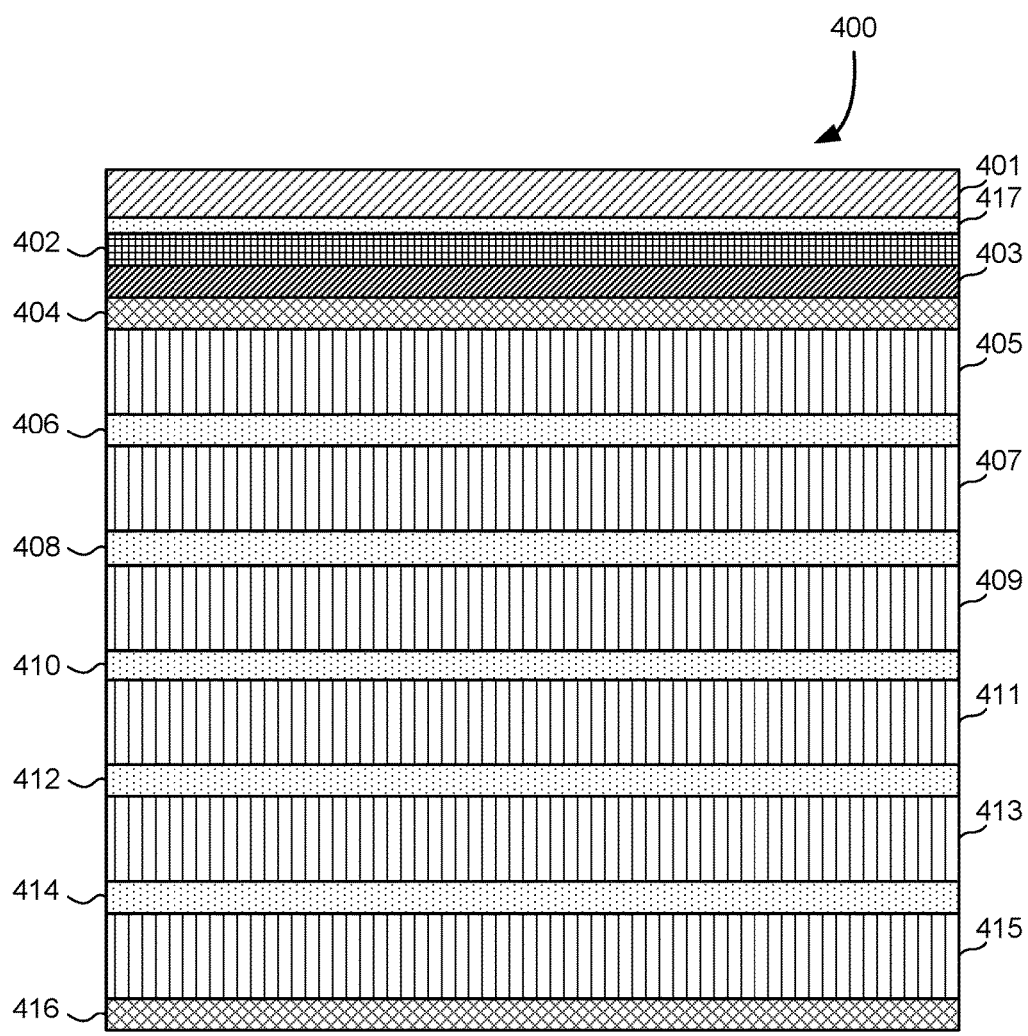
FIG. 4 is another exemplary flooring material according to some aspects of the present disclosure, including six wood layers in addition to the veneer.

FIG. 4 is another exemplary CLFM 400 according to some aspects of the present disclosure. The CLFM 400 is 3.1 mm thick compressed oak wood flooring. The CLFM 400 includes a veneer which is 0.5 mm oak panel 401 with a 20 mesh nonwoven fabric 417 which is applied to the back (inward-facing) side of the birch panel 401 using glue in order to prevent the veneer from cracking, such as during an impact. Next, there is a 0.05 mm thick adhesive paper 402 which is permeated with macromolecular glue. Next, there is a 0.2 mm thick kraft paper layer 403, and a 0.1 mm thick adhesive paper layer 404, which is permeated with micromolecular glue. The CLFM 300 also includes a 0.8 mm thick poplar layer 405, and then a 0.1 mm thick adhesive paper layer 406, which is permeated with micromolecular glue. The CLFM 300 also includes additional 0.8 mm thick poplar layers 407, 409, 411, 413, 415, and additional 0.1 mm thick adhesive paper layers 408, 410, 412, 414, 416, which are permeated with micromolecular glue.

The CLFM 400 manufacturing process is as follows:

1. The sugar and fat in the wood layers other than the 0.5 mm oak panel 401 is skimmed off at a high temperature. The 0.8 mm thick poplar layers 405, 407, 409, 411, 413, 415 are treated at a high temperature, and steam pressure is controlled to be less than 314 kPa. This may take approximately two hours to complete.

2. Next, glue is used to apply a 20 mesh nonwoven fabric 417 to the 0.5 mm oak panel 401 which will be the veneer for the CLFM 400.

3. Next, each of the 0.8 mm thick poplar layers 405, 407, 409, 411, 413, 415 and the 0.5 mm oak panel 401 are dry balanced. This process controls the water content of the panels to be between 8% and 9%.

4. Next, each of the 0.8 mm thick poplar layers 405, 407, 409, 411, 413, 415 and the 0.5 mm oak panel 401 are permeated with flame retardant under negative pressure.

5. Next, the various layers of the CLFM 400 are layered in the illustrated order and described order into a press machine, and then pressed together to form a plank. The press temperature is set at 250° C., the pressure is set at 2500 tons per sheet, or 840 kPa, and the total pressing time is 8 hours.

A CLFM 400 that is made using this process may be 3.15 mm thick, and may have a water swelling rate of 0.28% lengthwise, 1.09% laterally, and 4.2% in vertical thickness. The CLFM 400 may have a V-2 flammability rating.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A compressed layered plank material constructed with a plurality of layers, the plank material comprising:
    a first layer of the plurality of layers, the first layer constructed from plant material and including one of a nonwoven fabric and a fiberglass mesh adhered to an inward-facing portion of the plant material in order to increase an impact resistance of the plank material;
    a second layer of the plurality of layers, the second layer constructed from an adhesive paper material including a macromolecular glue;
    a third layer of the plurality of layers, the third layer constructed from one of bamboo, wood, or paper; and
    a fourth layer of the plurality of layers, the fourth layer constructed from an adhesive paper material including a micromolecular glue, wherein at least two of the plurality of layers are compressed together at a temperature of greater than 100° C. and a pressure of greater than 505 kPa, wherein
    the macromolecular glue comprises 50-55% melamine, 35-40% plasticizer, and 3-5% formaldehyde, and the micromolecular glue comprises 70-82% melamine, 5-12% plasticizer, and 3-6% formaldehyde.

2. The compressed layered plank material of claim 1, wherein the plant material of the first layer comprises bamboo and/or wood, and the first layer and the third layer are constructed from bamboo and/or wood that has been dry balanced and permeated with flame retardant material.

3. The compressed layered plank material of claim 1, wherein the one of the bamboo, wood, or paper of the third layer is plant material that has been de-sugared and skimmed.

4. The compressed layered plank material of claim 3, wherein the plant material of the third layer that has been de-sugared and skimmed is de-sugared and skimmed at a controlled steam pressure between 245 and 490 kPa.

5. The compressed layered plank material of claim 1, wherein each layer of the plurality of layers is compressed together at a temperature of greater than 100° C. and a pressure of greater than 505 kPa.

6. The compressed layered plank material of claim 1, wherein at least two of the plurality of layers are compressed together at a temperature of greater than 100° C. and less than 300° C., a pressure of greater than 505 kPa and less than 1680 kPa, and for a time of between three and six hours.

7. The compressed layered plank material of claim 1, wherein the plant material of the first layer is a veneer with a thickness of at least 0.45 mm, the first layer includes the nonwoven fabric, and the nonwoven fabric is at least 20 mesh nonwoven fabric.

8. The compressed layered plank material of claim 1, wherein the adhesive paper material of the second layer comprises 0.05 mm thick adhesive paper infused with the macromolecular glue.

9. The compressed layered plank material of claim 1, wherein the third layer is a paper, and the paper comprises 0.2 mm thick kraft paper.

10. The compressed layered plank material of claim 1, wherein the adhesive paper material of the fourth layer comprises 0.1 mm thick adhesive paper infused with the micromolecular glue.

11. The compressed layered plank material of claim 1, wherein the plurality of layers further comprises successive layers of plant material and adhesive paper material, and the adhesive paper material includes micromolecular glue.

12. The compressed layered plank material of claim 11, wherein the plant material of the successive layers has a thickness of 0.8 mm.

13. The compressed layered plank material of claim 11, wherein the adhesive paper material of the successive layers has a thickness of 0.1 mm.

14. The compressed layered plank material of claim 1, wherein there are at least two successive layers.

\* \* \* \* \*